(12) United States Patent
Majjigi et al.

(10) Patent No.: US 9,622,184 B2
(45) Date of Patent: Apr. 11, 2017

(54) TRANSPORT BLOCK SIZE AND CHANNEL CONDITION ASSESSMENT BASED POWER CONSUMPTION REDUCTION FOR CELLULAR COMMUNICATION

(71) Applicant: Apple Inc., Cupertino, CA (US)

(72) Inventors: Vinay R. Majjigi, Sunnyvale, CA (US); Tarik Tabet, Los Gatos, CA (US); Christian W. Mucke, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 172 days.

(21) Appl. No.: 14/492,724

(22) Filed: Sep. 22, 2014

(65) Prior Publication Data
US 2015/0085729 A1    Mar. 26, 2015

Related U.S. Application Data (63) Continuation of application No. 61/882,303, filed on Sep. 25, 2013.

(51) Int. Cl.
*H04W 52/12* (2009.01)
*H04W 52/24* (2009.01)
*H04W 52/14* (2009.01)
*H04W 52/26* (2009.01)
(Continued)

(52) U.S. Cl.
CPC ......... *H04W 52/12* (2013.01); *H04W 52/247* (2013.01); *H04W 52/367* (2013.01); *H04W 52/146* (2013.01); *H04W 52/265* (2013.01); *H04W 52/343* (2013.01); *Y02B 60/50* (2013.01)

(58) Field of Classification Search
CPC . H04W 52/12; H04W 52/247; H04W 52/146; H04W 52/265; H04W 52/343; H04W 52/367; Y02B 60/50
See application file for complete search history.

(56) References Cited

U.S. PATENT DOCUMENTS

| | | |
|---|---|---|
| 7,257,423 B2 | 8/2007 | Iochi |
| 7,340,267 B2 | 3/2008 | Budka et al. |
| 8,477,603 B2 | 7/2013 | Sambhwani et al. |

(Continued)

*Primary Examiner* — Walter Divito
(74) *Attorney, Agent, or Firm* — Meyertons Hood Kivlin Kowert & Goetzel, P.C.; Jeffrey C. Hood; Joel L. Stevens (57) ABSTRACT

This disclosure relates to reducing power consumption for cellular communication based on transport block size in combination with channel condition measurements for applications with certain application characteristics. In one embodiment, a transport block size for use for uplink communication with a base station by a wireless device may be selected. The transport block size may provide more robust communication characteristics than required for current channel conditions. The transport block size may be selected based on application characteristics of an application performing the uplink communication. A transmit power for the wireless device to use for the uplink communication may be selected based on the transport block size providing more robust communication characteristics than required for the current channel conditions. In particular, transport power selection may be biased towards a reduced transmit power based on the transport block size providing more robust communication characteristics than required for the current channel conditions.

20 Claims, 5 Drawing Sheets

(51) Int. Cl.
*H04W 52/34* (2009.01)
*H04W 52/36* (2009.01)

(56) References Cited

U.S. PATENT DOCUMENTS

| | | |
|---|---|---|
| 2002/0154611 A1 | 10/2002 | Khullar et al. |
| 2003/0153276 A1 | 8/2003 | Terry et al. |
| 2004/0147235 A1 | 7/2004 | Jin et al. |
| 2009/0021303 A1 | 1/2009 | Vinayak et al. |
| 2009/0040969 A1 | 2/2009 | Kim et al. |
| 2010/0128614 A1* | 5/2010 | Kuusela ............... H04L 12/5695 370/252 |
| 2010/0195614 A1 | 8/2010 | Nimbalker et al. |
| 2011/0085508 A1 | 4/2011 | Wengerter et al. |
| 2011/0164574 A1 | 7/2011 | Rao et al. |
| 2012/0275438 A1* | 11/2012 | Dai ................... H04W 72/1284 370/336 |
| 2013/0059546 A1 | 3/2013 | Lum et al. |
| 2013/0077582 A1* | 3/2013 | Kim .................... H04W 74/006 370/329 |
| 2013/0176864 A1* | 7/2013 | Quan ................ H04W 72/0473 370/245 |
| 2013/0187711 A1 | 7/2013 | Goedken et al. |
| 2013/0329559 A1* | 12/2013 | Cabrera ............. H04W 28/0289 370/235 |
| 2015/0017933 A1 | 1/2015 | McCallister |

\* cited by examiner

| $I_{TBS}$ | $N_{PRB}$ | | | | |
|---|---|---|---|---|---|
| | 1 | 2 | 3 | 4 | 5 |
| 0 | 16 | 32 | 56 | 88 | 120 |
| 1 | 24 | 56 | 88 | 144 | 176 |
| 2 | 32 | 72 | 144 | 176 | 208 |
| 3 | 40 | 104 | 176 | 208 | 256 |
| 4 | 56 | 120 | 208 | 256 | 328 |
| 5 | 72 | 144 | 224 | 328 | 424 |
| 6 | 328 | 176 | 256 | 392 | 504 |
| 7 | 104 | 224 | 328 | 472 | 584 |
| 8 | 120 | 256 | 392 | 536 | 680 |
| 9 | 136 | 296 | 456 | 616 | 776 |
| 10 | 144 | 328 | 504 | 680 | 872 |
| 11 | 176 | 376 | 584 | 776 | 1000 |
| 12 | 208 | 440 | 680 | 904 | 1128 |
| 13 | 224 | 488 | 744 | 1000 | 1256 |
| 14 | 256 | 552 | 840 | 1128 | 1416 |
| 15 | 280 | 600 | 904 | 1224 | 1544 |
| 16 | 328 | 632 | 968 | 1288 | 1608 |
| 17 | 336 | 696 | 1064 | 1416 | 1800 |
| 18 | 376 | 776 | 1160 | 1544 | 1992 |
| 19 | 408 | 840 | 1288 | 1736 | 2152 |
| 21 | 440 | 904 | 1384 | 1864 | 2344 |
| 21 | 488 | 1000 | 1480 | 1992 | 2472 |
| 22 | 520 | 1064 | 1608 | 2152 | 2664 |
| 23 | 552 | 1128 | 1736 | 2280 | 2856 |
| 24 | 584 | 1192 | 1800 | 2408 | 2984 |
| 25 | 616 | 1256 | 1864 | 2536 | 3112 |
| 26 | 712 | 1480 | 2216 | 2984 | 3752 |

VoIP Packet Fits Here → (328 in row 16)

TBS/MCS Supported After TPC Adjustment → (row 19)

TBS/MCS Supported (with Current Status) → (row 25)

TRANSPORT BLOCK SIZE AND CHANNEL CONDITION ASSESSMENT BASED POWER CONSUMPTION REDUCTION FOR CELLULAR COMMUNICATION

PRIORITY CLAIM

The present application claims benefit of priority to U.S. Provisional Application No. 61/882,303 titled "Transport Block Size and Channel Condition Assessment Based Power Consumption Reduction for Cellular Communication" and filed on Sep. 25, 2013, whose inventors are Vinay R. Majjigi, Tarik Tabet, and Christian W. Mucke, which is hereby incorporated by reference in its entirety as though fully and completely set forth herein.

FIELD

The present disclosure relates to wireless devices, and more particularly to a system and method for improving communication efficiency in a cellular communication system.

DESCRIPTION OF THE RELATED ART

Wireless communication systems are rapidly growing in usage. Further, wireless communication technology has evolved from voice-only communications to also include the transmission of data, such as Internet and multimedia content. There now exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

Cellular communication technologies may be capable of providing a variety of services, and may be used by a variety of applications. Different applications utilizing cellular communication may have different characteristics. Cellular communication techniques which do not take into account the different application characteristics of the various applications utilizing cellular communication may be in danger of operating inefficiently. Accordingly, improvements in the field would be desirable.

SUMMARY

Embodiments are presented herein of, inter alia, methods for performing wireless communication in a manner that considers application characteristics of an application using that channel for wireless communication, in combination with channel condition assessment and transport block size allocation, to determine transmit power levels, and of devices configured to implement the methods.

Many cellular communication technologies provide a wide range of possible modulation and coding schemes and possible resource allocations, which potentially provides a cellular network with a great deal of granularity in selecting transport block size for each wireless device in the cellular network. In order to select a most efficient transport block size from among these options given a wireless device's current channel conditions, a wireless device may generally perform an assessment of current channel conditions and report results of such an assessment to its serving base station.

In some instances, it may be the case that channel conditions would support modulation and coding schemes which provide more throughput than is actually needed for the application traffic between the cellular network and a given wireless device. For example, for a wireless device whose application traffic has small, fixed payloads (e.g., many voice applications or machine type communications), in good channel conditions a cellular link between the cellular network and the wireless device might be capable of supporting up to a transport block size with substantially higher packet size than required by the application(s) executing on the wireless device.

In such a case, the cellular network may be able to reduce the power consumption of the wireless device using the transmit power control loop between the wireless device and its serving base station. For example, according to the techniques described herein, a cellular base station may select a transport block size for a particular wireless device to use for uplink communications which, based on channel condition assessment results for the wireless device, provides more robust communication characteristics than required for current channel conditions. This transport block size may be selected for the wireless device based at least in part on application characteristics of an application performing uplink communication with the cellular base station over the cellular link; for example, the application might utilize a fixed (or approximately fixed) packet size, and the selected transport block size might support but not greatly exceed that fixed packet size.

Having selected a transport block size which includes a relatively robust modulation and coding scheme, the base station may then also select an uplink transmit power for the wireless device. Because of the relative robustness of the modulation and coding scheme given the channel conditions, the base station may be able to select a reduced (e.g., from a maximum transmit power level) transmit power level and still expect to be able to receive and decode the subsequent uplink communications from the wireless device.

The wireless device may subsequently use the allocated transport block size and transmit power for uplink communications with its serving base station. Power consumption by the wireless device may in this case be reduced (e.g., in comparison to a scheme in which a highest supported transport block size and maximum transmit power are allocated) while still fully meeting the application traffic needs of the wireless device. Furthermore, at least in some instances the lower transmit power level used by the wireless device may reduce interference with respect to other wireless devices in the wireless communication system.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices, laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, unicast/multicast/broadcast, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
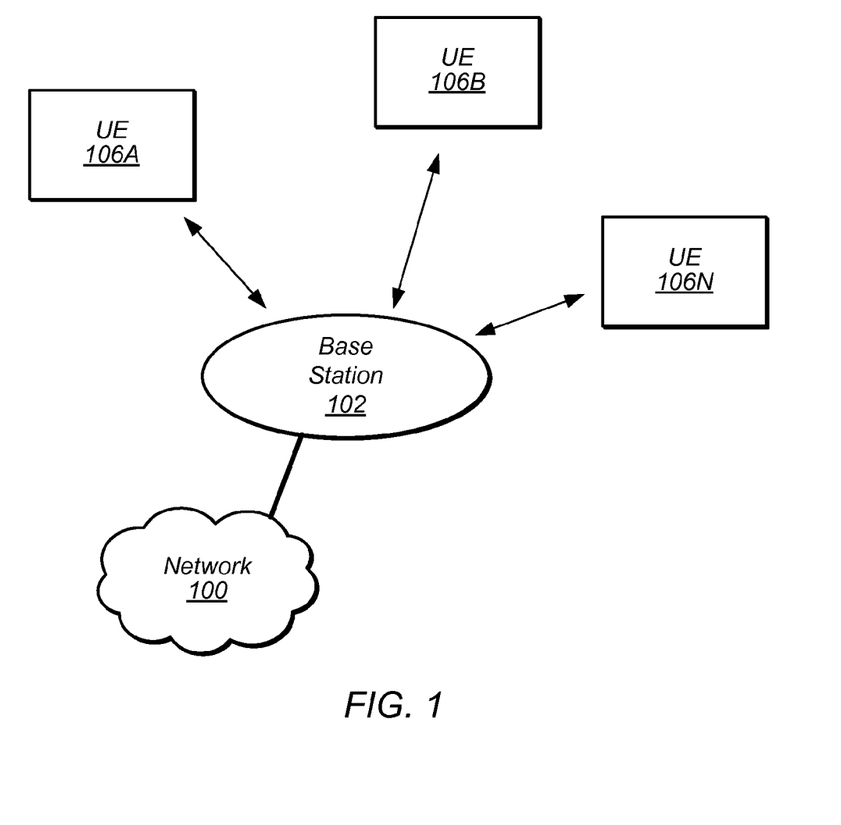
FIG. 1 illustrates an exemplary (and simplified) wireless communication system, according to one embodiment.
Figure 2:
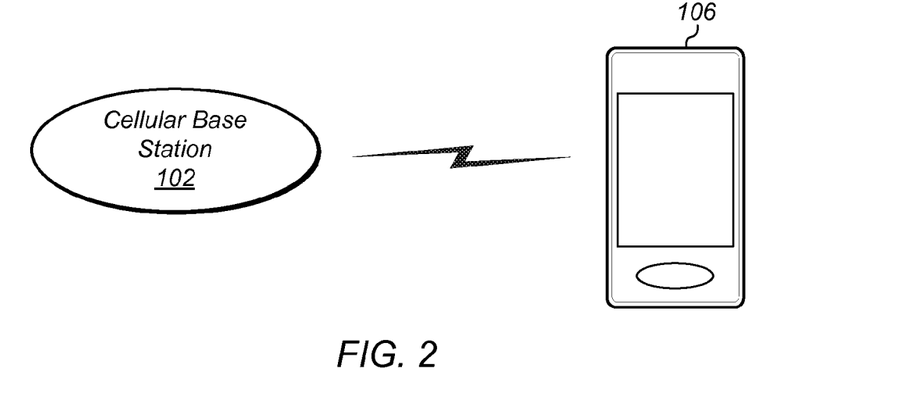
FIG. 2 illustrates a base station (BS) in communication with a user equipment (UE) device, according to one embodiment.

FIGS. 1-2—Communication System

FIG. 1 illustrates an exemplary (and simplified) wireless communication system, according to one embodiment. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106A through 106N. Each of the user devices may be referred to herein as a "user equipment" (UE). Thus, the user devices are referred to as UEs or UE devices.

The base station 102 may be a base transceiver station (BTS) or cell site (a "cellular base station"), and may include hardware that enables wireless communication with UEs 106 according to one or more cellular communication protocols. The UE 106 and the cellular base station 102 may communicate using any of various cellular communication technologies such as GSM, UMTS (associated with, for example, WCDMA or TD-SCDMA air interfaces), LTE, LTE-Advanced (LTE-A), HSPA, 3GPP2 CDMA2000 (e.g., 1×RTT, 1×EV-DO, HRPD, eHRPD), etc.

As shown, the cellular base station may be equipped to communicate with a network 100 (e.g., a core network of a cellular service provider, a telecommunication network such as a public switched telephone network (PSTN), and/or the Internet, among various possibilities). Thus, the base station 102 may facilitate communication between UEs 106 and/or between the UEs 106 and the network 100. In particular, the cellular base station 102 may provide UEs 106 with various telecommunication capabilities, such as voice, SMS and/or data services.

A UE 106 may be capable of communicating using multiple wireless communication standards. For example, the UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (associated with, for example, WCDMA or TD-SCDMA air interfaces), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates a UE device 106 (e.g., UE device 106A illustrated in FIG. 1) in communication with the cellular base station 102, according to one embodiment. The UE 106 may be a device with wireless network connectivity such as a mobile phone, a hand-held device, a computer or a tablet, or virtually any type of wireless device.

The UE 106 may include a processor that is configured to execute program instructions stored in memory. The UE 106 may perform any of the methods embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In one embodiment, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
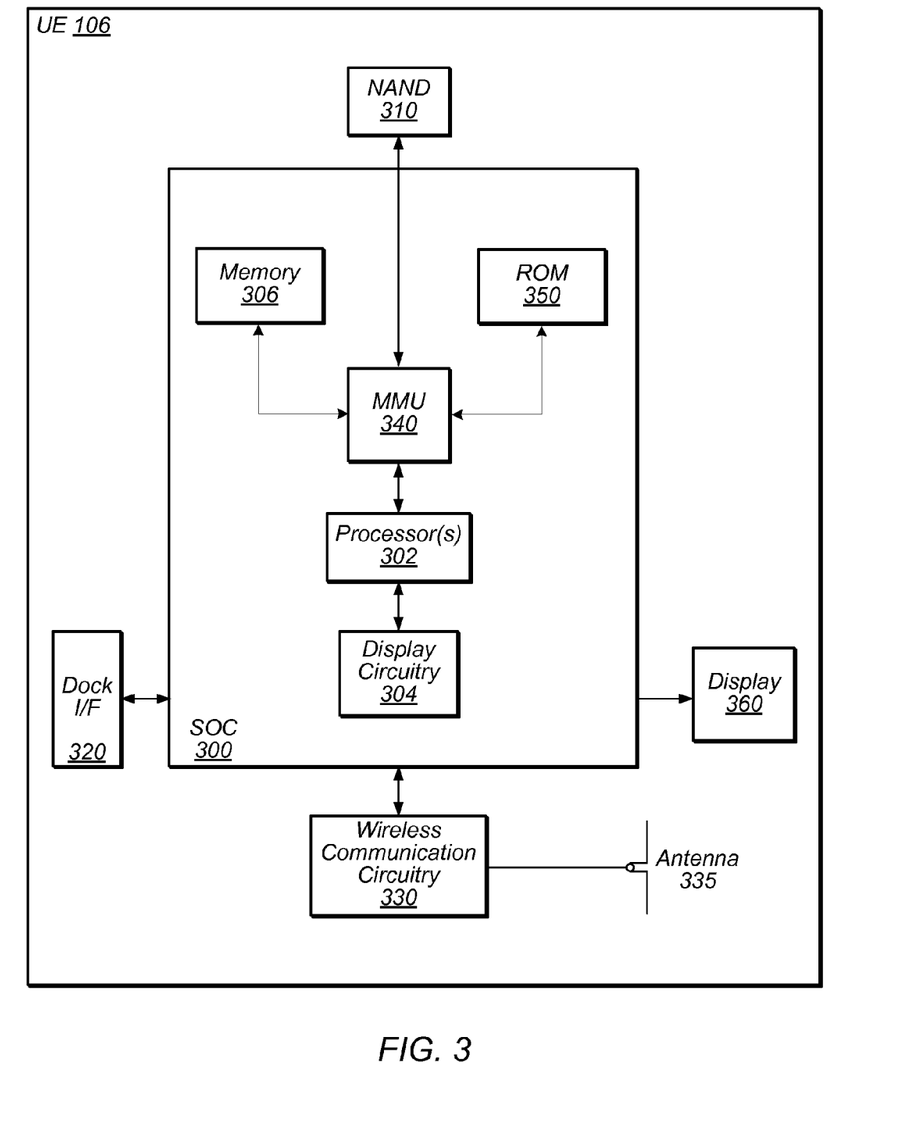
FIG. 3 illustrates an exemplary block diagram of a UE device, according to one embodiment.

FIG. 3—Exemplary Block Diagram of a UE

FIG. 3 illustrates an exemplary block diagram of a UE 106, according to one embodiment. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, CDMA2000, Bluetooth, Wi-Fi, GPS, etc.).

As shown, the UE device 106 may include at least one antenna (and possibly multiple antennas, e.g., for MIMO and/or for implementing different wireless communication technologies, among various possibilities), for performing wireless communication with base stations, access points, and/or other devices. For example, the UE device 106 may use antenna 335 to perform the wireless communication.

The UE 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

Figure 5:
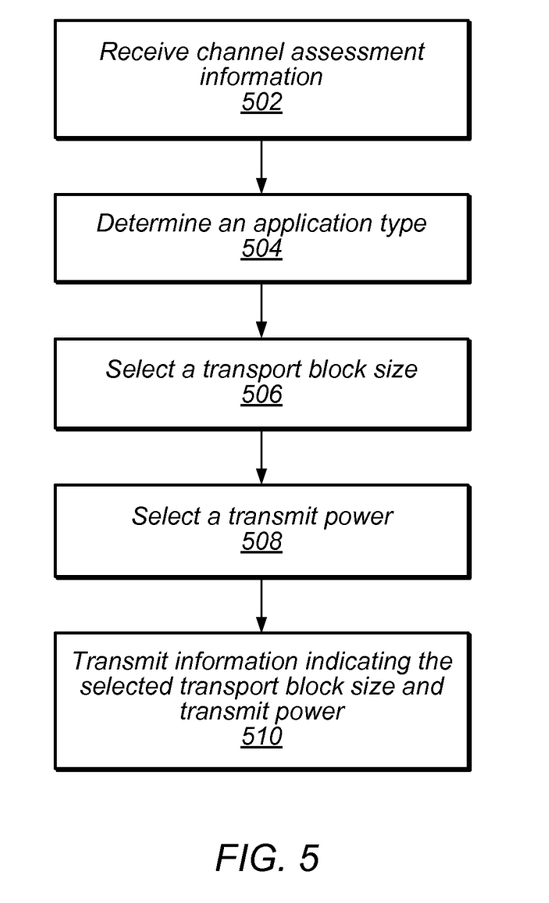
FIG. 5 is a flowchart diagram illustrating aspects of an exemplary technique for modifying transmit power control based on transport block size and channel conditions in conjunction with application characteristics, according to one embodiment.

As described herein, the UE 106 may include hardware and software components for implementing features for reducing power consumption based on transport block size and channel conditions in conjunction with application characteristics, such as those described herein with reference to, inter alia, FIG. 5. The processor 302 of the UE device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 5.

Figure 4:
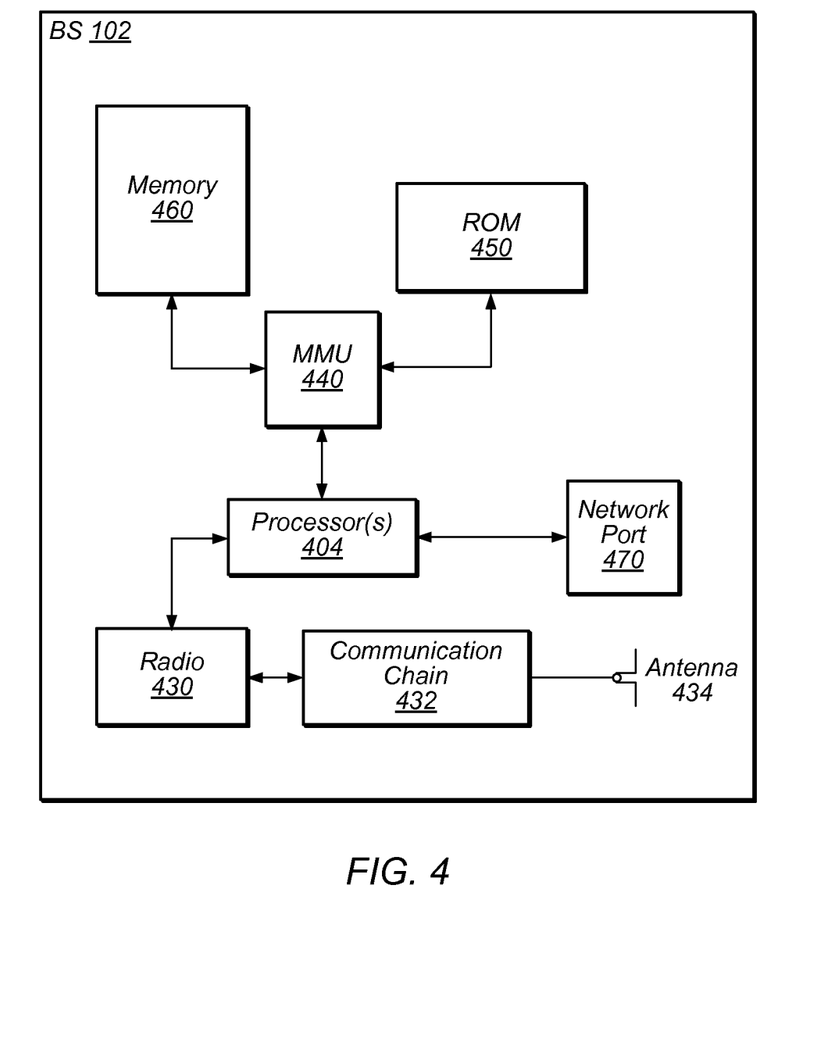
FIG. 4 illustrates an exemplary block diagram of a BS, according to one embodiment.

FIG. 4—Exemplary Block Diagram of a Base Station

FIG. 4 illustrates an exemplary block diagram of a cellular base station (BS) 102, according to one embodiment. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above with respect to FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, GSM, WCDMA, CDMA2000, Wi-Fi, etc.

The base station 102 may be configured to support power consumption efficient operation of a UE 106 in conjunction with cellular communication services. In particular, the BS 102 may include hardware and software components for implementing (or for use in conjunction with a UE 106 implementing) part or all of a method for selecting UE uplink transmit power which takes into account transport block size and channel conditions in conjunction with application characteristics of an application utilizing the cellular link, such as the features described herein with reference to, inter alia, FIG. 5.

The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

FIG. 5—Flowchart

Cellular communication may be used by a variety of different applications. The characteristics of the various applications which may use cellular communication may differ greatly from one another. For example, some applications, such as high-definition real-time video chat or videoconferencing applications and certain gaming applications, may be relatively demanding with respect to bandwidth, latency, and other communication link characteristics. Other applications, such as bulk data transfers (e.g., file uploads/downloads), may be very flexible with respect to bandwidth demands/usage, and may not be particularly sensitive to link latency.

An increasingly important type of application which may utilize packet-switched cellular communication link may be the voice application. In particular, certain cellular technologies such as LTE and LTE-A are moving towards an all internet protocol (IP) infrastructure, in which voice over IP (VoIP) packet-switched communications are used for voice communications instead of circuit-switched communications.

Voice applications may use any of a variety of codecs for compressing and decompressing voice data, including AMR-NB 12.2 kbps, AMR-WB 12.65 kbps, and many others. Given a particular codec, a voice application may typically utilize fixed (or approximately fixed) sized packets which may be communicated at regular (or approximately regular) intervals. Compared to many other applications which utilize cellular communication links, voice applications packets may be relatively small, and considering typical maximum cellular link capacity, voice applications may be relatively undemanding of network resources.

As another example, certain machine type communication (MTC) may generally include periodic, low data rate communication. Such communication, which might be used by process control devices, automation devices, measurement/monitoring devices such as thermometers, barometers, hydrometers, electricity meters, seismometers, etc., among various possibilities, may in many cases be relatively undemanding of network resources.

Given the differing characteristics of different types of applications which may use cellular links, it may be desirable to perform cellular communication in a manner which considers and makes use of these differing application characteristics in a manner that improves (reduces) UE and/or network power consumption and/or improves network efficiency.

FIG. 5 is a flowchart diagram illustrating one such method. In particular, FIG. 5 illustrates an exemplary method for a base station to select uplink transmit power for a UE device in a manner that considers application characteristics, according to one embodiment. The method shown in FIG. 5 may be used in conjunction with any of the computer systems or devices shown in the above Figures, among other devices. Some of the method elements shown may be performed concurrently, in a different order than shown, or may be omitted. Additional method elements may also be performed as desired. As shown, the method may operate as follows.

In 502, channel assessment information may be received by the base station from a UE. The channel assessment information may be indicative of current channel condition quality. As one example, the channel assessment information may include one or more channel quality indicator (CQI) measurements taken by the UE. As another example, the channel assessment information may include reference signals transmitted by the UE, which may be used by the BS to assess the uplink channel of the UE. Any of various other forms of channel assessment information are also possible.

In 504, application characteristics of an application on the UE performing uplink communications with the cellular base station may be determined. The application characteristics may include any of a variety of application traffic characteristics. As one example, the application characteristics may include one or more of typical transmission and/or reception frequency and/or regularity, typical packet size, and/or degree of packet size variation.

In some cases, application characteristics may be monitored/measured over a period of time, and thus may be determined based on the previous (uplink and/or downlink) traffic pattern(s) of the UE. Alternatively, or in addition, application characteristics may in some cases be inferred from an application type of the application and/or a Quality of Service (QoS) Class Indicator (QCI) associated with an application. For example, it may be determined that the application is a voice (e.g., VoIP) application (e.g., for which QCI=1), and may thus be determined to have certain characteristics based on being a voice application. Similar determinations might be made based on other application types (e.g., video chat applications, gaming applications, email and/or other productivity applications, streaming video applications, MTC applications, etc.) and/or QCI values.

In 506, a transport block size for the UE's uplink communication may be selected. Selecting the transport block size may include selecting a number of physical resource blocks to assign the UE, and selecting a modulation and coding scheme for the UE to utilize for uplink communication. The transport block size may be selected based at least in part on current channel conditions (e.g., as indicated by the channel assessment information or uplink channel quality measurement made by the base station on reference signals transmitted by the UE), and may further be based at least in part on the application characteristics (e.g., application traffic characteristics) of the application on the UE performing uplink communications with the cellular base station. For example, as one possibility, the transport block size may be selected based at least in part on average packet size for the application if packet size variance for application traffic is below a packet size variance threshold.

In certain cases (e.g., depending on the application characteristics), the transport block size selected may be formed on the basis of a modulation and coding scheme which is more robust than required for current channel conditions (e.g., as understood based on the channel assessment information). For example, in some instances an application may utilize a fixed packet size (or possibly nearly fixed, such as an average packet size with packet size variance below a packet size variance threshold) for uplink communication. In such a scenario, the BS may select a transport size which includes the lowest order MCS which supports the fixed packet size. In this case, if current channel conditions would also support one or more higher order MCS than the selected MCS, the selected MCS may be more robust MCS than required by the current channel conditions, while also providing a sufficiently large transport block size to accommodate the application packets. For example, a voice application or a MTC application might have suitable application characteristics for such a scenario to occur, and might accordingly be assigned a transport block size which provides more robust communication characteristics than required for current channel conditions. As one specific possibility, the selected MCS may be the most robust MCS which, in combination with the selected physical resource block allocation, provides sufficient transport block size to accommodate application packets of the application.

In 508, a transmit power level for the UE to use for its uplink communication with the base station may be selected. Selection of the transmit power level may be selected based at least in part on the transport block size selected, and may also be based on the channel assessment information. For example, if the selected transport block size does provide more robust communication characteristics than required for current channel conditions, selection of the transmit power may be biased towards a reduced transmit power, and may include selection of a transmit power which is less than the maximum configurable transmit power (e.g., according to the cellular communication technology used by the BS and the UE to communicate) for the UE on that basis. For example, as one possibility, the selected transmit power may be a minimum transmit power for which current channel conditions would support the selected transport block size (i.e., including the selected MCS). As another possibility, the selected transmit power may be greater than the minimum transmit power for which current channel conditions would support the selected transport block size by a predetermined amount, provided that transmit power would not be greater than the maximum configurable transmit power value. If that transmit power would be greater than the maximum configurable transmit power value, as one possibility the maximum configurable transmit power value may be selected in such a scenario.

Since in this example the current channel conditions may be relatively good in consideration of the selected TBS, reducing transmit power may not significantly negatively affect the base station's capability to successfully receive and decode the UE's uplink communications. Thus, reducing transmit power in such a case may benefit the UE in particular (e.g., by reducing power consumption, since a reduced transmit power may reduce device power consumption) and the cellular network as a whole (e.g., since reduced transmit power by the UE may also effectively reduce interference seen on the network).

Note that the degree to which transmit power selection may be biased towards a reduced transmit power may depend on the degree of difference between the MCS selected as part of TBS selection and the maximum MCS that would be supported by current channel conditions. For example, if the maximum MCS index supported by current channel conditions were 25 and the MCS index selected as part of TBS selection were 16, a greater degree of transmit power reduction might be induced than if the maximum MCS index supported by current channel conditions were 20.

In 510, information indicating the selected transport block size and transmit power may be transmitted to the UE. The UE may perform at least one a subsequent uplink communication according to the selected transport block size and transmit power.

Note that the method of FIG. 5 may be repeated any number of times (e.g., may be part of a recurring control loop), if desired.

Figure 6:
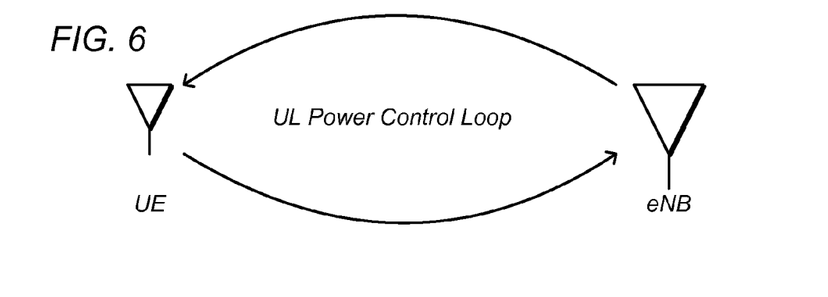
FIG. 6 illustrates an exemplary transmit power control loop which may be used in cellular communication, according to one embodiment.

FIG. 6—Transmit Power Control Loop

FIG. 6 illustrates an exemplary uplink transmit power control loop which may be used in conjunction with cellular communication, according to one embodiment. For example, the uplink transmit power control loop illustrated in FIG. 6 may be used in conjunction with the method illustrated in and described with respect to FIG. 5, as one possibility. Note that while the following information is provided for illustrative purposes of certain exemplary details which may be used in some implementations, this information is provided by way of example only, and is not intended to be limiting to the disclosure as a whole.

A common feature of cellular communication may be the use of a transmit power control loop between UEs and base stations. In such a transmit power control loop, a UE may gather certain information (such as information relating to downlink channel conditions) and transmit that information to the base station. The UE may also transmit reference signals to the base station to enable the base station to gather information relating to uplink channel conditions. The base station may consider that information and, in combination and coordination with various other network elements (e.g., other UEs in the system) and considerations, indicate to the UE certain characteristics which the UE should use for its communications back to the base station for a subsequent period of time.

As noted above, among the information gathered by the UE may be information relating to channel conditions. For example, the UE may perform a channel quality assessment in which a communication channel is monitored for a period of time, measurements are taken on one or more aspects of the communication channel (such as signal to noise ratio, among various possible measurements indicative of channel quality), and formulated into a format expected by the BS. One such example of a channel quality assessment report may be a channel quality indicator (CQI) report. Likewise, in some instances the UE may transmit reference signals, based on which the base station may determine the uplink channel quality for the UE. One example of such reference signals may include Sounding Reference Signals (SRS) according to LTE.

Among the characteristics of uplink communication to be used by a UE which a BS may determine based on information (such as SRS or CQI reports) provided by the UE may be a modulation and coding scheme (MCS). Higher order MCSs may provide greater throughput, but each incremental higher MCS may require incrementally better channel conditions to support the MCS without resulting in excessive error rates and packet losses. Said another way, each possible MCS may have a different robustness, and so each may be suitable only for a certain range of channel condition quality.

Thus, MCS selection may be at least partially dependent on channel conditions. For example, if a given MCS is used in worse channel conditions than it is suited for, it may result in excessive packet loss and thus inefficient and possibly ineffective communication. Accordingly, except when channel conditions are sufficiently good that all configurable MCS schemes (e.g., as defined according to a given cellular standard) would be suitable, only a (e.g., lower order/more robust) subset of possible MCSs may effectively be available to choose from at any given time. In many cases, a channel assessment may result in a value which may be mapped to a specific MCS index value by the BS. That MCS index may represent the maximum (highest order/highest throughput) suitable MCS for the channel conditions represented by that value.

Another characteristic of UE uplink communication which a BS may determine may include a physical resource block (PRB) assignment. This may correspond to the amount of network resources (e.g., amount of channel bandwidth) allotted to a UE for a given uplink communication. Thus, a greater number of PRBs assigned to a UE may correspond to a greater throughput capacity being provided to the UE. Taken together, the number of PRBs and the MCS assigned to a UE may define its transport block size (TBS), or the maximum amount of data that may be communicated in a given transport interval.

A further characteristic of UE uplink communication which a BS may determine may include a transmit power to be used by the UE for uplink communications. The transmit power selected may be determined in any of a variety of ways according to different cellular communication standards, and may further differ within a cellular communication standard according to various scenarios. As one example, in LTE, UE transmit power may be calculated by a base station differently depending on whether the physical uplink shared channel (PUSCH) is being used with or without simultaneous physical uplink control channel (PUCCH) use. In particular, for PUSCH without simultaneous PUCCH, then UE transmit power may be given as:

$$P_{PUSCH,c}(i) = \min\left\{\begin{array}{l} P_{CMAX}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array}\right\}[dBm]$$

In contrast, for PUSCH with simultaneous PUCCH, UE transmit power may be given as:

$$P_{PUSCH,c}(i) = \min \begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} [\text{dBm}]$$

Even so, in each of these cases most of the parameters for the UE power control loop are specified by the 3GPP specification. However, the base station may have some discretion over the power control loop, in particular as in the term $\delta_{PUSCH,c}$ which may be used as a correction value in the derivation of $f_c(i)$ in the following equation:

$$f_c(i) = f_c(i-1) + \delta_{PUSCH,c}(i - K_{PUSCH}).$$

Thus, if (e.g., as described with respect to FIG. 5) a BS determines to assign to a UE a TBS which provides more robust communication characteristics than required for current channel conditions, the BS may be able to modify (e.g., reduce) the UE's transmit power by way of this term in the power control loop to account for such extra robustness in the TBS.

The UE and the BS may repeat execution of such a control loop over the course of time during which they are in communication, in order to adjust communication characteristics to meet changing conditions (e.g., application traffic, channel conditions, network saturation, etc.).

Figure 7:
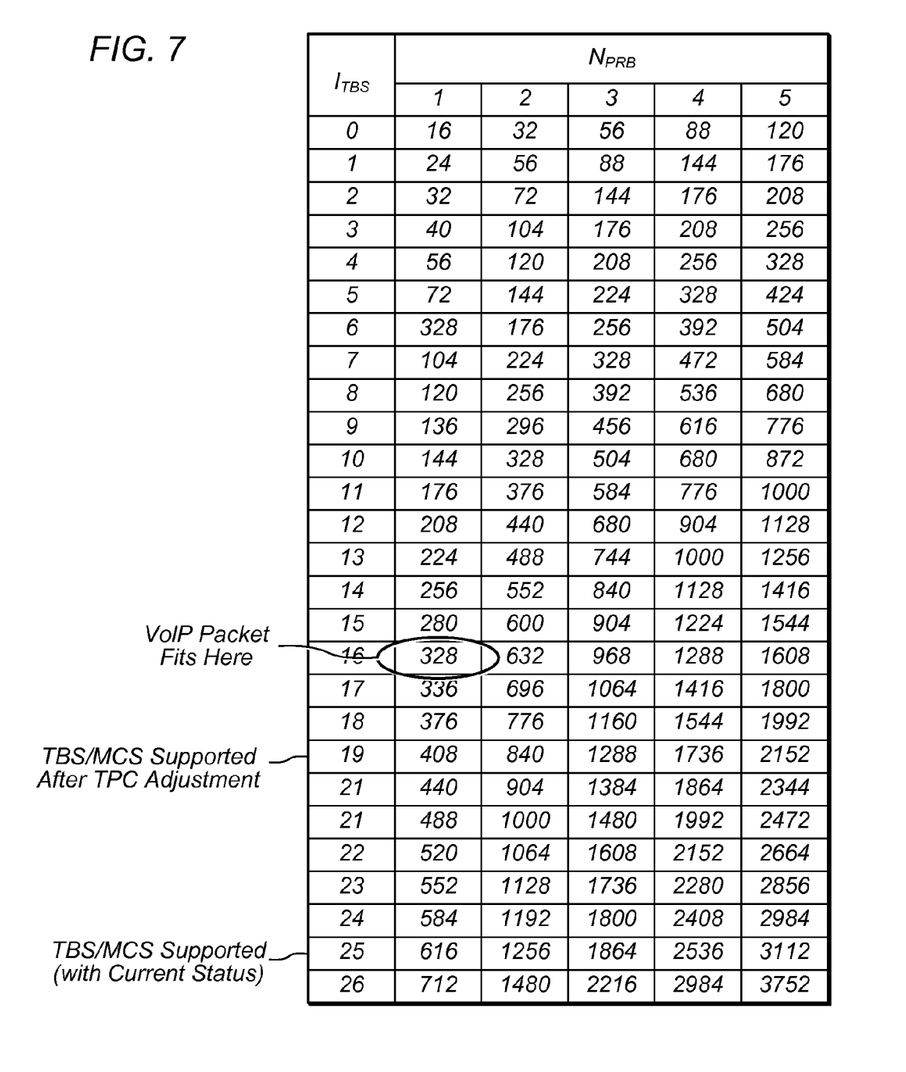
FIG. 7 is a table illustrating an exemplary transport block size table which may be used in conjunction with cellular communication, according to one embodiment.

FIG. 7—TBS Table

FIG. 7 illustrates an exemplary TBS table which may be used in conjunction with cellular communication systems, according to one embodiment. For example, the exemplary TBS table of FIG. 7 may be used in conjunction with the method illustrated in and described with respect to FIG. 5, as one possibility. Note that while the following information is provided for illustrative purposes of certain exemplary details which may be used in some implementations, this information is provided by way of example only, and is not intended to be limiting to the disclosure as a whole.

As shown, the table illustrated in FIG. 7 indicates transport block sizes resulting from various combinations of TBS indices (which may be correlated or identical to MCS indices) and numbers of physical resource blocks assigned to a UE. As shown, the transport block sizes may generally increase with both TBS index ($I_{TBS}$) and with number of PRBs assigned ($N_{PRB}$).

In particular, the table illustrated in FIG. 7 may be used to illustrate an exemplary scenario in which UE uplink transmit power might be reduced based on having more robust TBS than required for a particular set of channel conditions.

For example, consider a scenario in which a voice (e.g., VoIP) application typically utilizes packets which comfortably fit in an $I_{TBS}$ of 16 in a single PRB. Now, consider that current channel conditions would support an $I_{TBS}$ of 25. In this case, if a base station assigns (e.g., based on application characteristics of the voice application and/or based on the application type being a voice application) the $I_{TBS}$ of 16 and a single PRB, the communication characteristics provided may be more robust than required for the actual channel conditions.

Given this 'headroom' in the robustness of the TBS assigned to the UE, the BS may (e.g., in accordance with the method of FIG. 5) determine to reduce the transmit power which the UE should use in conjunction with the assigned TBS. For example, the BS might calculate a reduction in transmit power by the UE in a manner that effectively reduces this 'headroom'. Note that at least in some cases, the transmit power reduction may still leave some robustness headroom; for example, as shown, the transmit power might be reduced such that the transmit power indicated to the UE by the BS, given the current channel conditions, would still support an $I_{TBS}$ of 19. If desired, greater or lesser transmit power adjustments (e.g., resulting in greater or lesser robustness headroom) may also be used.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A cellular base station, comprising:
a radio; and
a processing element operably coupled to the radio;
wherein the radio and the processing element are configured to:
determine current channel conditions between a wireless user equipment (UE);
determine application traffic characteristics for uplink communications of an application executing on the UE, wherein the application traffic characteristics relate to characteristics of packets or transmission patterns of the packets of the application traffic;
select a transport block size for a UE to use for the uplink communication with the cellular base station, wherein the transport block size provides more robust communication characteristics than required for the current channel conditions, wherein the transport block size is selected at least in part based on the application traffic characteristics, wherein the cellular base station is configured to select different transport block sizes for different application traffic characteristics; and
select a transmit power for the UE to use for uplink communication with the cellular base station based at least in part on the transport block size providing more robust communication characteristics than required for current channel conditions, wherein selection of the transmit power results in reduction of the transmit power relative to a typical transmit power based on the transport block size providing more robust communication characteristics than required for current channel conditions; and transmit an indication of the selected transport block size and the selected transmit power.

2. The cellular base station of claim 1,
wherein being configured to select the transport block size comprises being configured to select a modulation and coding scheme (MCS) and a physical resource block (PRB) allocation for the UE to use for uplink communication with the cellular base station, wherein the selected MCS is a most robust MCS which, in combination with the selected PRB allocation, provides sufficient transport block size to accommodate application packets of the application.

3. The cellular base station of claim 1,
wherein the transmit power selected is a minimum transmit power for which current channel conditions would support the selected transport block size.

4. The cellular base station of claim 1,
wherein being configured to select the transmit power comprises being configured to select the lesser of a transmit power value which is greater than a minimum transmit power for which current channel conditions would support the selected transport block size by a predetermined amount or a maximum configurable transmit power value.

5. The cellular base station of claim 1,
wherein the application traffic characteristics of the application comprise one or more of application traffic regularity, application traffic average packet size, or degree of application traffic packet size variation.

6. The cellular base station of claim 1,
wherein the cellular base station operates according to LTE, wherein selection of the transmit power results in reduction of the transmit power based on the transport block size providing more robust communication characteristics than required for current channel conditions by selection of a value for $\delta_{PUSCH,c}$ used to calculate UE transmit power.

7. The cellular base station of claim 1, wherein the radio and the processing element are further configured to:
receive, from the UE, uplink reference signals configured to determine current uplink channel conditions,
wherein selection of the transport block size and the transmit power for the UE are also based at least in part on the uplink reference signals received from the UE.

8. The cellular base station of claim 1, wherein the application traffic characteristics comprise average packet size and packet size variance, wherein the transport block size is selected at least in part based on average packet size if packet size variance is below a packet size variance threshold.

9. A method for a cellular base station (BS) to select uplink communication characteristics for a wireless user equipment (UE) device, the method comprising:
by the BS:
receiving, from the UE, an indication of current channel conditions of a wireless communication channel;
determining application traffic characteristics for uplink communications of an application of the UE;
selecting a transport block size for the UE to use for the uplink communication with the BS on the wireless communication channel based at least in part on the indication of current channel conditions of the wireless communication channel, wherein the transport block size is also selected at least in part based on the application traffic characteristics of the application of the UE;
selecting a transmit power for the UE to use for uplink communication with the BS on the wireless communication channel based on the selected transport block size and the indication of current channel conditions of the wireless communication channel; and
transmitting, to the UE, an indication of the selected transport block size and the selected transmit power.

10. The method of claim 9,
wherein the selected transport block size provides more robust communication characteristics than required for the current channel conditions,
wherein selecting the transmit power is biased towards a reduced transmit power based on the transport block size providing more robust communication characteristics than required for current channel conditions.

11. The method of claim 9,
wherein the indication of current channel conditions comprises a Sounding Reference Signal (SRS), wherein the SRS is usable by the BS to determine a highest order modulation and coding scheme supported by the current channel conditions.

12. The method of claim 9,
wherein the application traffic characteristics comprise average packet size and packet size variance, wherein the transport block size is selected at least in part based on average packet size if packet size variance is below a packet size variance threshold.

13. The method of claim 12,
wherein selecting the transport block size for the UE comprises selecting a modulation and coding scheme (MCS) and a physical resource block (PRB) allocation for the UE,
wherein the method further comprises, by the base station:
selecting a most robust MCS which, in combination with the PRB allocation, supports the average packet size of the application if current channel conditions support at least that MCS.

14. The method of claim 13,
wherein selecting the transmit power comprises selecting a transmit power value which is greater than a minimum transmit power for which current channel conditions would support the selected MCS by a predetermined amount.

15. The method of claim 9, wherein the application traffic characteristics of the application comprise one or more of application traffic regularity, application traffic average packet size, or degree of application traffic packet size variation.

16. A non-transitory computer accessible memory medium comprising program instructions for a cellular base station (BS) to select uplink communication characteristics for a wireless user equipment (UE) device, wherein when executed, the program instructions cause the BS to:
receive, from the UE, an indication of current channel conditions of a wireless communication channel;
determine application traffic characteristics for uplink communications of an application of the UE;
select a transport block size for the UE to use for the uplink communication with the BS on the wireless communication channel based at least in part on the indication of current channel conditions of the wireless communication channel, wherein the transport block size is also selected at least in part based on the application traffic characteristics;

select a transmit power for the UE to use for uplink communication with the BS on the wireless communication channel based on the selected transport block size and the indication of current channel conditions of the wireless communication channel; and transmit, to the UE, an indication of the selected transport block size and the selected transmit power.

17. The memory medium of claim 16, wherein when executed, the program instructions further cause the BS to:

determine the application traffic characteristics of an application on the UE performing uplink communication with the BS based on a past uplink traffic pattern of the UE.

18. The memory medium of claim 16 wherein if the application performs uplink communications with the BS on the wireless communication channel using a fixed packet size and the current channel conditions support at least a modulation and coding scheme (MCS) sufficient to support the fixed packet size, the selected transport block size comprises a lowest order MCS which supports the fixed packet size, such that if the current channel conditions also support one or more higher order MCS than the lowest order MCS which supports the fixed packet size, the selected transport block size provides more robust communication characteristics than required for current channel conditions.

19. The memory medium of claim 16 wherein if the selected transport block size provides more robust communication characteristics than required for current channel conditions, selecting the transmit power comprises selecting a transmit power which is less than a maximum configurable transmit power based on the selected transport block size providing more robust communication characteristics than required for current channel conditions.

20. The memory medium of claim 16, wherein when executed, the program instructions further cause the BS to:

perform said receiving, said determining, selecting a transport block size, selecting a transmit power, and transmitting in a repeating manner as part of a recurring cellular communication control loop.

* * * * *